US005685887A

United States Patent [19]
Mochida

[11] Patent Number: 5,685,887
[45] Date of Patent: Nov. 11, 1997

[54] FILTER ELEMENT

[75] Inventor: Kazuomi Mochida, Tokyo, Japan

[73] Assignee: Going Tokyo, Co, Ltd., Japan

[21] Appl. No.: 579,194

[22] Filed: Dec. 27, 1995

[30] Foreign Application Priority Data

Jun. 20, 1995 [JP] Japan .................. 7-007137 U

[51] Int. Cl.$^6$ .................................................. B01D 39/08
[52] U.S. Cl. .................................. 55/336; 55/510; 55/521
[58] Field of Search ........................... 55/521, 336, 510

[56] References Cited

U.S. PATENT DOCUMENTS

| 1,918,006 | 7/1933 | Walton . | |
|---|---|---|---|
| 2,190,683 | 2/1940 | Schaaf et al. | 55/521 |
| 2,835,340 | 5/1958 | McGuff et al. | 55/521 |
| 3,385,039 | 5/1968 | Burke et al. | 55/521 |
| 3,870,495 | 3/1975 | Dixson et al. | 55/51 |
| 4,647,373 | 3/1987 | Tokar et al. . | |
| 5,350,515 | 9/1994 | Stark et al. | 55/521 |
| 5,458,666 | 10/1995 | Miyakata | 55/521 |
| 5,549,724 | 8/1996 | Mochida | 55/521 |

FOREIGN PATENT DOCUMENTS

| 112705 | 3/1941 | Australia | 55/521 |
|---|---|---|---|
| 153865 | 10/1953 | Australia | 55/521 |

*Primary Examiner*—Tim R. Miles
*Attorney, Agent, or Firm*—Rogers & Killeen

[57] ABSTRACT

A filter element is constructed such that a filter material having a corrugated sectional surface is formed in the shape of a cylindrical housing, and an upper opening portion of the cylindrical housing is kept closed, and an lower opening portion is connected to an air suction duct. A row of hills and valleys of the corrugated sectional surface is formed with a certain front angle relative to the wall surface of the cylindrical casing.

5 Claims, 3 Drawing Sheets

FILTER ELEMENT

BACKGROUND OF THE INVENTION

The present invention relates to the structure of a filter element for an exposed type air cleaner unit mounted on a vehicle engine or the like. Conventionally, an air cleaner unit equipped in a suction system of the vehicle engine is generally constructed in a covered type that a filter element is accommodated in an air cleaner case connected to a suction duct but an element exposed type air cleaner unit having a filter element itself directly connected to a suction duct without any use of a cover defined by an air cleaner case is known as an optional accessory or a so-called after part. Since the element exposed type air cleaner unit has a high air suction efficiency compared with the covered type since the filter element is exposed to the outside, whereby the engine has an effect of increased output. For this reason, an element exposed type air cleaner unit is often substituted for a conventional one for, e.g., a sport type passenger car. However, since an installation space for the air cleaner unit is restrictively defined in an engine room, various designs have been made with respect to the contour and the structure of the filter element so as to allow the vehicle to be equipped with a filter element having a good suction efficiency.

FIG. 5 is a sectional view which shows by way of example the structure of a conventional element exposed type air cleaner unit A. A filter element is designed in the form of a tapered cylindrical housing B having a filter wall surface which exhibits a corrugated sectional contour with the use of a filter material such as paper, cloth, unwoven cloth or the like. A ring-shaped connecting member D molded of a synthetic rubber and having a suction duct connection port C is integrally connected to the large diameter side end of the cylindrical housing B of the filter element, while a blind cover member E made of a metallic material or a synthetic rubber is integrally connected to the small diameter side end of the cylindrical housing B of the filter element by vulcanization or adhesion. This air cleaner unit A is mounted on an engine such that the suction duct connection port C is firmly fitted to a joint fitting H connected via a connection duct G molded of rubber or the like and, the duct G is connected to an engine suction tube F.

With the air cleaner unit A shown in FIG. 5, the blind cover member E is molded on a synthetic rubber inclusive of the outer peripheral ring portion. Otherwise, only the outer peripheral portion is made of rubber, and the cover member E made of a metallic plate or a synthetic rubber plate is firmly fixed around the inner periphery of the outer peripheral portion.

The air cleaner unit A shown in FIG. 5 is constructed to suck air at a high air suction efficiency with a small filter element since it has a large suction area with a small contoured filter element even though the outer contour is designed to be compact, because the filter element includes a filter material having a corrugated sectional shape of which housing is designed to a tapered cylindrical housing B of which peripheral wall serves as an air suction surface.

SUMMARY OF THE INVENTION

The present invention has been made in consideration of the foregoing background.

An object of the present invention is to provide a filter element which assures that an air suction efficiency can be increased and that it can suppress the generation of suction noise and the occurrence of a swirl flow at the time of air suction although outer dimensions of the filter element are left unchanged compared with a conventional filter element.

To accomplish the above object, the present invention provide a filter element which is constructed such that a filter material having a corrugated sectional surface is formed in the shape of cylindrical housing, an upper opening portion of the cylindrical housing is kept closed, and a lower opening portion is connected to an air suction duct of an engine, wherein a row of hills and valleys on the filter material having a corrugated sectional surface is formed with a certain front angle relative to the wall surface of the cylindrical casing.

The cylindrical housing of the filter element may be formed in a cylindrical contour or a tapered contour having a reduced diameter at the upper part thereof. In addition, a funnel portion serving as an air funnel may be added inside of the upper opening portion.

According to the present invention, the funnel portion additionally formed on the upper opening portion may be formed of a filter material or a non filter material, provided that a cone-shaped or inverted tapered funnel portion is truncated with a foremost end opened. In this case, the foremost end opened portion is closed with a filter material.

With the filter element of the present invention, the air funnel is formed on the inner peripheral surface between the lower opening portion of the cylindrical housing and the connection duct of the suction pipe.

Since the front angle defined by a row of hills and valleys on the corrugated sectional surface of the filter material relative to the wall surface of the cylindrical housing is inclined, in the case that a filter element having same outer dimensions is formed, the filter element of the present invention can assume a larger filtering area than that of the conventional one. In addition, since the front angle defined by a row of hills and valleys on the corrugated sectional surface of the filter element is inclined relative to the cylindrical housing, and moreover, an air funnel-shaped portion is formed on an opening portion of the cylindrical housing, sucked air can correctly be streamed in one direction while suppressing an occurrence of swirl flow. Thus, the filter element of the present invention effectively functions in respect of generation of noisy sound of sucked air or suction efficiency.

DESCRIPTION OF THE PREFERRED EMBODIMENT

The present invention will now be described in detail hereinafter with reference to the accompanying drawings.

Figure 1:
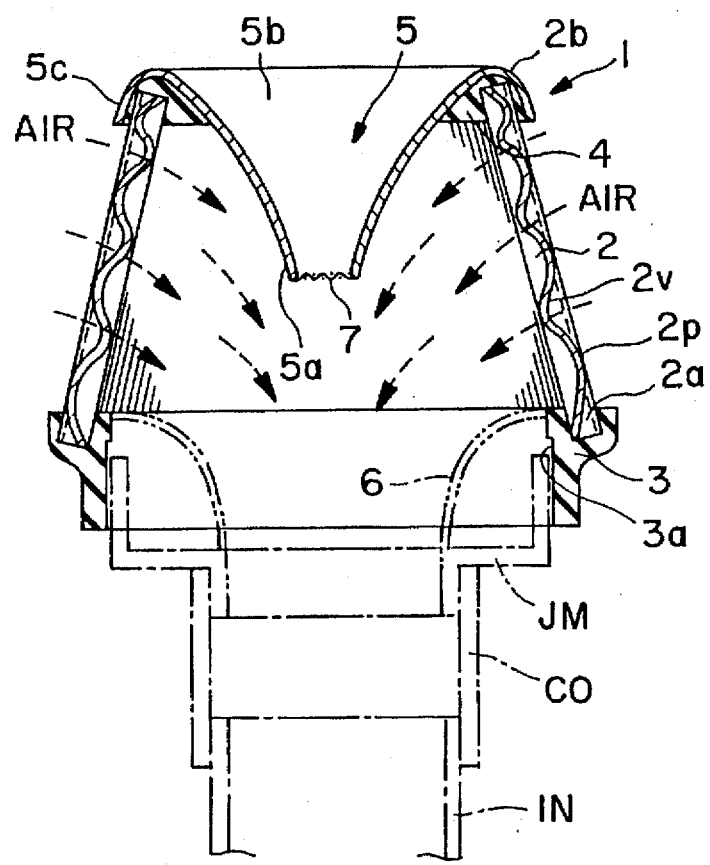
FIG. 1 is a vertical sectional view which shows by way of example the structure of filter element constructed according to an embodiment of the present invention.

In FIG. 1, reference numeral 1 denotes an air cleaner unit having an air cleaner element of the present invention employed therefor, reference numeral 2 denotes a cylindrical housing of the filter element for which a filtering material 2A having a corrugated sectional shape is formed to exhibit a tapered cylindrical contour, reference numeral 3 denotes a connecting member to be connected to an air suction duct on the engine side which is formed at a large diameter side opening end of a cylindrical housing 2 of the filter element, reference numeral 4 denoted an edge member which is formed on the small diameter side opening end of the cylindrical housing 2, and reference numeral 5 denotes an air funnel member of which root side is connected to a small diameter side opening end of the filter element.

Figure 2:
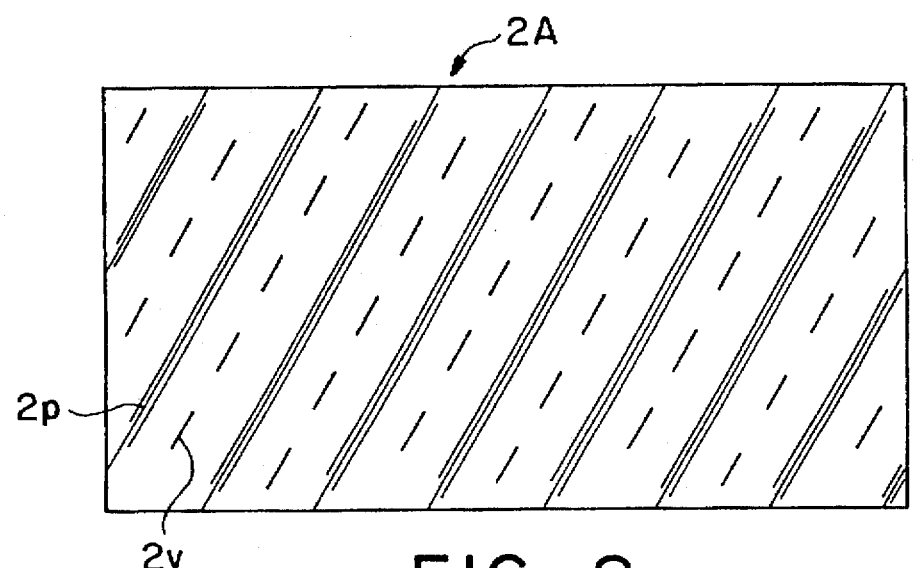
FIG. 2 is an expanded plan view of a filter material used for the filter element of the present invention.

As shown in FIG. 2, the cylindrical housing 2 of the filter element is such that a filter material 2A made of cloth, paper, unwoven cloth or the like and exhibiting a corrugated sectional shape is formed to a tapered cylindrical housing 2. According to the present invention, to increase a filtering area of the filter surface, a row of hills 2p and valleys 2v of the corrugated sectional shape of the filter material 2A shown in FIG. 2 is formed to exhibit a sectional pattern having an adequate inclination angle (hereinafter referred to as a front angle or a bias angle) as viewed from the front side. It should be noted that although any illustration is neglected herein, both the inner and outer surface of the cylindrical housing 2 of the filter element are reinforced with a metallic net but even in the case that the cylindrical housing 2 is not reinforced with a metallic net, it exhibits a function as a filter element without any change.

When the filter material 2A shown in FIG. 2 is wound to the cylindrical shape as it is, the cylindrical housing 2 of the filter element of the present invention having a row of hills 2p and valleys 2v is formed slantwise on the corrugated sectional surface is formed. With the cylindrical housing 2 of the filter element, since the corrugated sectional surface serving as an air suction surface is formed with the bias angle relative to the cylindrical housing 1, a size of the air filtering surface or a length of the filtering line is enlarged compared with the conventional filter element having the corrugated sectional surface formed with an attitude extending at a right angle relative to the lower side of the filter material 2A. Thus, a filter element having a larger air suction area can be formed with a same outer diameter. This fact is same in the case that the cylindrical housing 2 is formed with a tapered contour.

As mentioned above, since the corrugated sectional surface is formed with a biased contour relative to the cylindrical housing 2, the air sucked from the outer peripheral surface to the inner surface becomes a turn flow which turns along the whole peripheral surface in one direction depending on the angle of the corrugated sectional surface relative to the cylindrical housing 10. Thus, a swirl flow hardly occurs at the central part in the filter element.

In the embodiment of the filter element shown in FIG. 1, a connecting member 3 formed at the lower opening potion of the cylindrical housing 2 is formed in the ring-shaped contour using a synthetic rubber or the like integrated with an end part 2a of the large diameter side opening portion of the cylindrical housing 2 by vulcanization and adhesion, while the end part 2a is held in the embedded state. The connecting member 3 is formed to a stepped hole-shaped air suction duct connecting port 3a on the inner peripheral side. In this embodiment, the air suction duct connecting port 3a is firmly fitted to a joint tool JM connected to an air suction tube IN constituting the air suction system via a collar CO made of rubber.

With the filter element of the present invention, since the corrugated sectional surface of the filter material 2A forming the cylindrical housing 2 is formed with a bias angle relative to the wall surface of the cylindrical housing 2, the aforementioned specific effect is obtainable. Since the foregoing effect is obtainable with a filter element including an additional structure according to another embodiment as noted below, the additional structure according to the embodiment will be described below.

First, with respect to the cylindrical housing 2 of the filter element 1, an edge member 4 molded of a synthetic rubber or the like is attached to the upper end of the cylindrical housing 1 by vulcanization of adhesion to serve as a support ring for an air funnel member 5 to be described below.

The air funnel member 5 is formed in the shape of a truncated cone of which upper end is kept opened and extends in the downward direction, and its root side (large diameter side) 3b is formed to a curved folding portion 5c extending along the outer shape of the edge member 4. The root side 5b is held by attaching to the outer surface of the edge member 4 located at a small diameter side opening portion 2b of the cylindrical housing 2 of the air cleaner unit shown in FIG. 1 using an adhesive. On the other hand, a lower end opening portion 5a is closed with a filter material 7 from which air is sucked.

The material for the air funnel member 5 may have a filter function or may not have filter function while paper, plastics, metallic material or ceramics is employed as a material. The outer surface of the funnel member 5 is formed in the shape of a smooth exponential conical contour. In the case that the air funnel member 5 is formed by a filter material so that exterior air is sucked through the air funnel member, it is preferable that an air permeability of the air funnel member 5 is lower than that of the filter materials 2A and 7 constituting the cylindrical housing 2 so as to maintain a laminar flow effect. In addition, there is a case that the downward extending cone-shaped funnel member 5 is not formed in the shape of a truncated contour with an intermediate part eliminated, and therefore, no filter material 7 is used.

Figure 3:
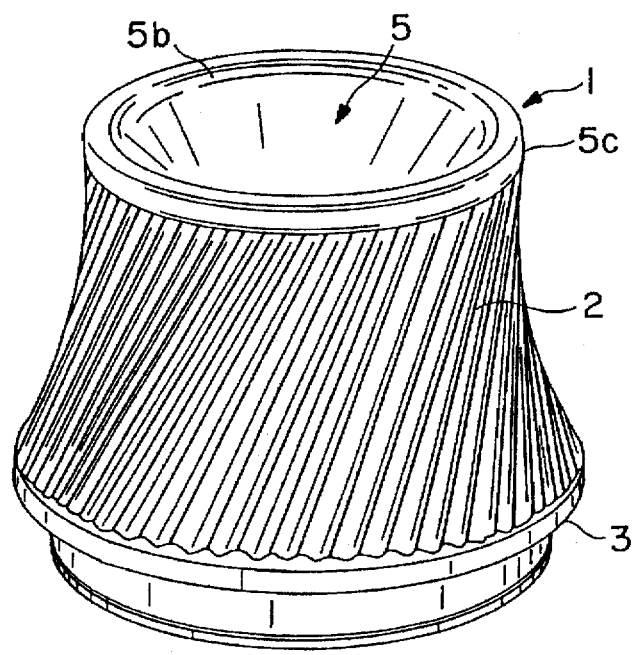
FIG. 3 is a perspective view of the filter element of the present invention.

With the filter element of the present invention as shown in FIG. 1 and FIG. 3, the air sucked in the filter element from the whole outer peripheral surface of the cylindrical housing 2 is sucked in the same direction by the corrugated sectional surface while forming a laminar flow, and flows in the suction tube IN side after the air flow is correctly streamed along the outer surface of the air funnel member 5. Thus, compared with the conventional filter element having the air sucking surface on the corrugated sectional surface and including no air funnel member 5, there very hardly arises a swirl flow at the central part of the cylindrical housing 2, and moreover, a center flow is easily formed in an air flow passage of an air flow meter disposed in the air sucking pipe IN. Thus, air suction is smoothly achieved with very small suction sound, and a swirl flow is hardly caused, resulting in less reduction of the air suction efficiency. In addition, with the filter element including the filter material 7 at the opening portion 5a of the truncated funnel member 5 as shown in FIG. 1, the air correctly streamed by the funnel member 5 is sucked from the filter member 7 located at the central part. Thus, the foregoing effect is additionally enhanced.

According to the present invention, to add or raise up the correct streaming effect obtainable by the bias angle of the corrugated surface of the cylindrical housing 2 and the air funnel, there arise an occasion that an air funnel member 6 represented by phantom lines in FIG. 1 is disposed inside of the connecting member 3 formed at the large diameter side opening end 2a of the cylindrical housing 2. This air funnel member 6 is disposed on the inner surface side of the connecting member 3 so as to obstruct a suction efficiency of the air sucked from the whole surface of the cylindrical housing 2, whereby a correct streaming effect and a suction efficiency are further enhanced.

Figure 4:
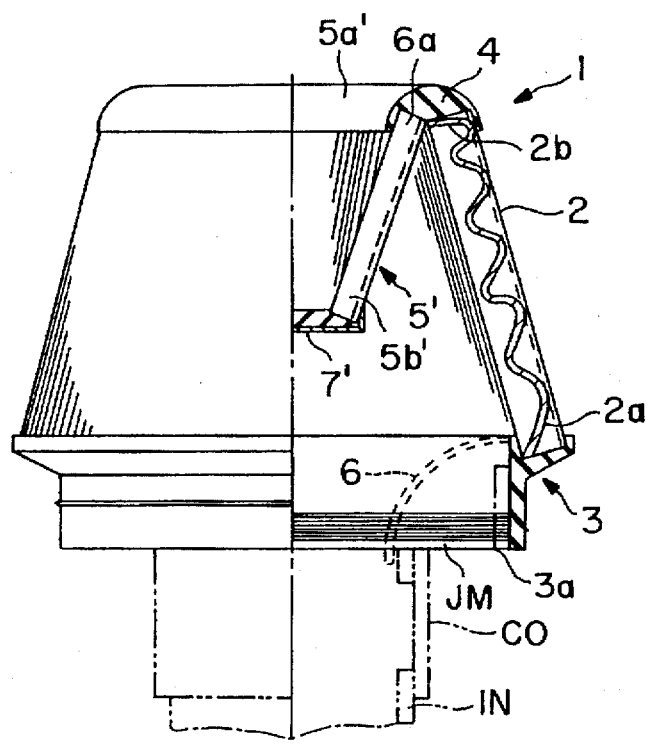
FIG. 4 is a fragmentary vertical sectional view of the filter element constructed according to another embodiment of the present invention.
Figure 5:
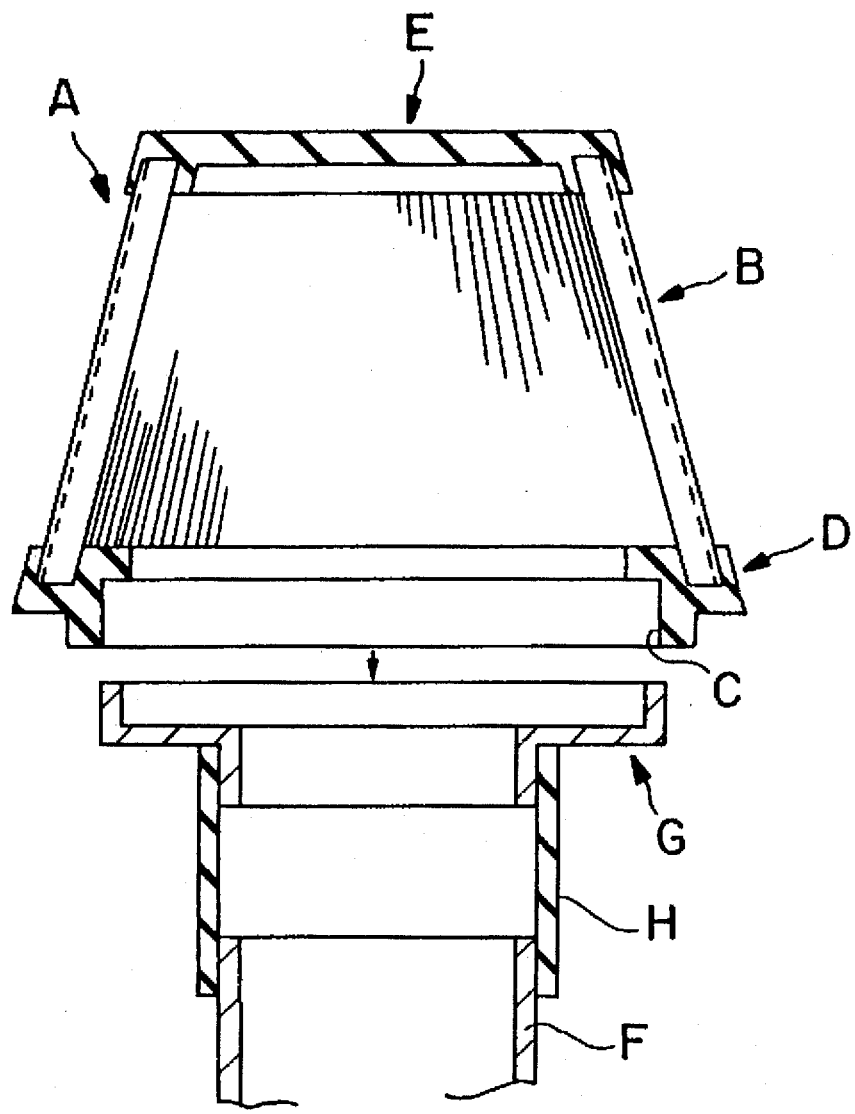
FIG. 5 is a vertical sectional view of a conventional filter element to be used for an air cleaner.

FIG. 4 is a fragmentary sectional view which shows by way of another example the structure of a filter element which is constructed such that an upper opening portion 2b of the tapered cylindrical housing 2 is embedded in an edge member 4, and a filter member 2A having a corrugated sectional surface with the same bias angle applied as that of the cylindrical housing 2 in the preceding embodiment or a small sub-filter element 5' of which filter material having a normal corrugated sectional surface is formed to a reverse tapered contour and of which both surfaces are reinforced with a metallic net is integrally connected to the edge element 4 at a large diameter opening portion 5a' of the element 5' by vulcanization and adhesion.

The sub-filter element 5' serves as an air funnel and sub-filter in cooperation with the edge member 4 while the larger diameter side opening portion 5a' is held in the embedded state. It should be noted that a small diameter side opening portion 5b of the sub-filter element 5' is projected inside of the cylindrical housing 2. The small diameter side opening portion 5b' of the sub-filter element 5' is fitted with a filter member 7 (not shown) or it is provided with a cover member 7' made of a synthetic rubber to close an opening therewith.

Also in this embodiment, to enhance a correct streaming effect in the corrugated sectional state, it is desirable that an air funnel 6 represented by phantom lines in FIG. 4 is fitted to a large diameter side opening portion 2a of the cylindrical housing 2. When this air funnel member 6 is provided, a correct streaming effect and a suction effect are further enhanced up in the same manner as the preceding embodiment.

While the present invention has been described above with respect to a few preferred embodiments thereof, it should of course be understood that the present invention should not be limited only to these embodiments but various change or modification may be made without departure from the scope of the present invention as defined by the appended claims.

What id claim is:

1. an air filter comprising a sheet of pleated first air filtering material having a generally cylindrical shape with a closed top and an open bottom for providing filtered air through said open bottom in which pleats in said material are angled tangentially relative to a longitudinal axis of said cylindrical shape for deflecting filtered air;

a funnel having a first, larger end for closing said closed top and a second, smaller end which extends into said cylindrical shape for deflecting filtered air towards said open bottom, the combination of said angled pleats and said funnel for deflecting air inside said cylindrical shape in a laminar and generally swirl-free flow of filtered air through said open bottom, wherein said second end of said funnel has a truncated end for filtering air.

2. The air filter of claim 1 wherein said open bottom has a larger diameter than said closed top.

3. The air filter of claim 1 wherein said funnel comprises a second air filtering material.

4. The air filter of claim 3 wherein said first air filter material has a higher air permeability than that of said second air filter material.

5. The air filter of claim 4 wherein said second end of said funnel has a truncated end comprised of said first air filtering material.

* * * * *